US007243636B2

(12) United States Patent
Joos et al.

(10) Patent No.: US 7,243,636 B2
(45) Date of Patent: Jul. 17, 2007

(54) METHOD FOR OPERATING A FUEL MEASUREMENT SYSTEM IN A MOTOR VEHICLE, COMPUTER PROGRAM, CONTROL DEVICE AND FUEL MEASUREMENT SYSTEM

(75) Inventors: Klaus Joos, Walheim (DE); Thomas Frenz, Noerdlingen (DE); Matthias Schumacher, Asperg (DE); Bernd Fluhrer, Moeglingen (DE); Tim Hollmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 10/507,537

(22) PCT Filed: Dec. 4, 2002

(86) PCT No.: PCT/DE02/04437

§ 371 (c)(1),
(2), (4) Date: May 11, 2005

(87) PCT Pub. No.: WO03/078817

PCT Pub. Date: Sep. 25, 2003

(65) Prior Publication Data

US 2005/0224051 A1 Oct. 13, 2005

(30) Foreign Application Priority Data

Mar. 14, 2002 (DE) ................. 102 11 283

(51) Int. Cl.
*F02M 57/02* (2006.01)
*F02M 69/46* (2006.01)
(52) U.S. Cl. ...................... 123/456; 123/446

(58) Field of Classification Search ............... 123/446, 123/447, 467, 497, 494, 478, 480
See application file for complete search history.

(56) References Cited

U.S. PATENT DOCUMENTS

| 6,192,863 B1 * | 2/2001 | Takase ................. 123/456 |
| 6,250,285 B1 * | 6/2001 | Takase ................. 123/456 |
| 6,308,685 B1 | 10/2001 | Becker |
| 6,349,702 B1 * | 2/2002 | Nishiyama ............. 123/456 |
| 6,463,910 B2 * | 10/2002 | Nishiyama ............. 123/456 |
| 6,557,530 B1 * | 5/2003 | Benson et al. .......... 123/480 |
| 6,712,045 B1 * | 3/2004 | McCarthy, Jr. .......... 123/456 |
| 6,823,834 B2 * | 11/2004 | Benson et al. .......... 123/299 |
| 6,971,368 B2 * | 12/2005 | Uchiyama ............. 123/359 |

FOREIGN PATENT DOCUMENTS

| EP | 0 916 831 | 5/1999 |
| EP | 1 030 047 | 8/2000 |
| WO | WO 95 23921 | 9/1995 |

* cited by examiner

*Primary Examiner*—Thomas Moulis
(74) *Attorney, Agent, or Firm*—Kenyon & Kenyon LLP

(57) ABSTRACT

A method for operating a fuel metering system of a motor vehicle is provided, in which fuel is delivered by at least one supply pump to at least one high pressure area, the fuel being injected by at least one fuel injector from the high pressure area directly into at least one combustion chamber, at least one sensor detecting the pressure in the high pressure area, and at least one pressure regulating element being provided for adjusting the pressure in the high pressure area.

8 Claims, 4 Drawing Sheets

METHOD FOR OPERATING A FUEL MEASUREMENT SYSTEM IN A MOTOR VEHICLE, COMPUTER PROGRAM, CONTROL DEVICE AND FUEL MEASUREMENT SYSTEM

FIELD OF THE INVENTION

The present invention relates to a method for operating a fuel metering system of a motor vehicle.

BACKGROUND INFORMATION

One of the common fuel metering systems for motor vehicles is known as the common rail system. In this system, fuel is delivered by a first fuel pump from a fuel reservoir to a first pressure area. Starting from this first pressure area, the fuel is transported by a high pressure pump into a common rail which is under very high pressure. In the case of a diesel common rail system, pressures for example may reach 2000 bar, and in the case of a gasoline common rail system, pressures may reach up to 150 bar. The fuel is injected by a fuel injector at predefinable points in time from the common rail directly into a combustion chamber of the combustion engine.

Normally there is a pressure regulating element, for example a pressure control valve or the like, located in the high pressure area, usually directly on the common rail. This pressure regulating element is actuatable by a control unit, usually the engine control unit, in such a way that various pressures are attainable in the common rail. In this case, the various pressures are matched to the various operating situations, in which different pressures make sense for optimizing the combustion process.

A special problem of a common rail system arises in the starting phase, since at the moment the engine starts, the pressure in the common rail in an extreme case corresponds merely to an admission pressure. It is thus necessary for optimal combustion to elevate the pressure in the common rail to normal operating pressure as quickly as possible. To this end, for example, the control unit specifies that a maximum rail pressure be set by the pressure regulating element. During the phase in which the rail pressure is rising to its normal level, there is naturally a very great change in pressure in the rail over time, which makes it difficult to meter fuel as intended. Due to the transient pressure conditions in the common rail, it is very difficult for the control unit to calculate an injection time that corresponds to the fuel injection quantity actually desired. This also sometimes results from the fact that a computation of the fuel injection time is performed first, and only afterward is it possible to actuate the fuel injector accordingly. Thus there is a time difference between the computation of the injection and the actual injection itself. Within this period there is a possibility, that because of the transient pressure conditions in the common rail, a fuel pressure that is different from that intended by the control unit when calculating the injection time will develop.

SUMMARY OF THE INVENTION

It is therefore an object of the present invention to provide a method for operating a fuel metering system which improves the metering of fuel as desired compared to the known methods.

The object is achieved through a system and method for operating a fuel metering system of a motor vehicle, in which fuel is delivered by at least one supply pump to at least one high pressure area, the fuel being injected by at least one fuel injector from the high pressure area directly into at least one combustion chamber, at least one sensor detecting the pressure in the high pressure area, at least one pressure regulating element being provided for adjusting the pressure in the high pressure area, and change in pressure in the high pressure area over time being limited. This limitation of the change in pressure in the high pressure area over time according to the present invention reliably improves the metering of fuel as intended.

Because the rail pressure gradient is limited to a maximum value, the precision of the fuel metering is also increased, since the limitation of the rail pressure gradient results in a maximum specifiable rail pressure difference between the moments at which a fuel injection is calculated and the moment at which a fuel injection is carried out by actuating the fuel injector.

In a first example embodiment of the present invention, the change in pressure in the high pressure area over time is limited as a function of a maximum possible fuel delivery by the supply pump. The maximum allowed rail pressure gradient is advantageously set to a value that lies within the range of the maximum physically possible values of the fuel metering system. Regulation of the rail pressure is improved by this measure according to the present invention. Advantageously, the pressure gradient values that are permissible here are saved to speed-dependent and load-dependent characteristic maps in a memory of the control unit. In this way, the maximum permissible rail pressure gradient may be adjusted or adapted in an ideal way to any operating situation.

In an example embodiment of the method according to the present invention, the change in pressure in the high pressure area over time is limited as a function of a specifiable injection quantity error. This measure according to the present invention makes it possible in a particularly advantageous way to specify the maximum injection quantity error using which possible exhaust gas limiting values are just still implementable. Since there is practically always a time discrepancy between the computation of the injection time and the actual activation of the fuel injector, as explained earlier, the method according to the present invention results particularly advantageously in a computable maximum injection quantity error, due to the fact that the maximum rail pressure gradient is limited. Particularly advantageous is the refinement of the method according to the present invention, that the limitation of the change in pressure in the high pressure area over time is always specified in a period between two rail pressure gradient computations. The method thereby is particularly advantageously oriented toward the computation cycle of the rail pressure gradient, which varies depending on the speed of the combustion engine.

In another embodiment of the method according to the present invention, along with the injection quantity error, consideration is given to at least the instantaneous pressure in the high pressure area and/or a sampling rate of the pressure measurement in the high pressure area and/or an engine speed and/or specific data of the supply pump when determining the limitation of the change in rail pressure over time. The specific data of the supply pump means here for example the number of cams that are driven via the high pressure pump. This allowance for additional relationships adapts the method according to the present invention particularly advantageously to all significant influencing parameters of the fuel metering system.

In another embodiment of the method according to the present invention limiting values are determined in at least two different ways, the minimum of the limiting value is determined by a comparison operation, and this minimum value is selected as the limit for the change in pressure in the high pressure area over time. The minimum rail pressure gradient which results from various types of determination is thus selected. This ensures at every moment that the rail pressure gradient does not exceed critical values in any operating situation.

The method according to the present invention may be implemented in the form of a computer program that is intended for an internal combustion engine, e.g., for a motor vehicle. The computer program has a sequence of instructions that are suitable for carrying out the method according to the present invention when they are executed on a computer.

Furthermore, the sequence of instructions may be stored on a computer-readable data medium, for example a diskette, a CD-ROM, a DVD, a flash memory or the like.

The present invention also provides a control unit for operating a fuel metering system of a motor vehicle, in which fuel is delivered by at least one supply pump to at least one high pressure area, the fuel being injected by at least one fuel injector from the high pressure area directly into at least one combustion chamber, at least one sensor detecting the pressure in the high pressure area, at least one pressure regulating element being provided for adjusting the pressure in the high pressure area, and the change in pressure in the high pressure area over time being limitable.

The present invention also provides a fuel metering system for an internal combustion engine of a motor vehicle, having at least one supply pump for transporting fuel to at least one high pressure area, at least one fuel injector for direct injection of the fuel from the high pressure area into at least one combustion chamber, at least one sensor for detecting the pressure in the high pressure area, and at least one pressure regulating element for setting the pressure in the high pressure area, the change in pressure in the high pressure area over time being limitable.

DETAILED DESCRIPTION

Figure 1:
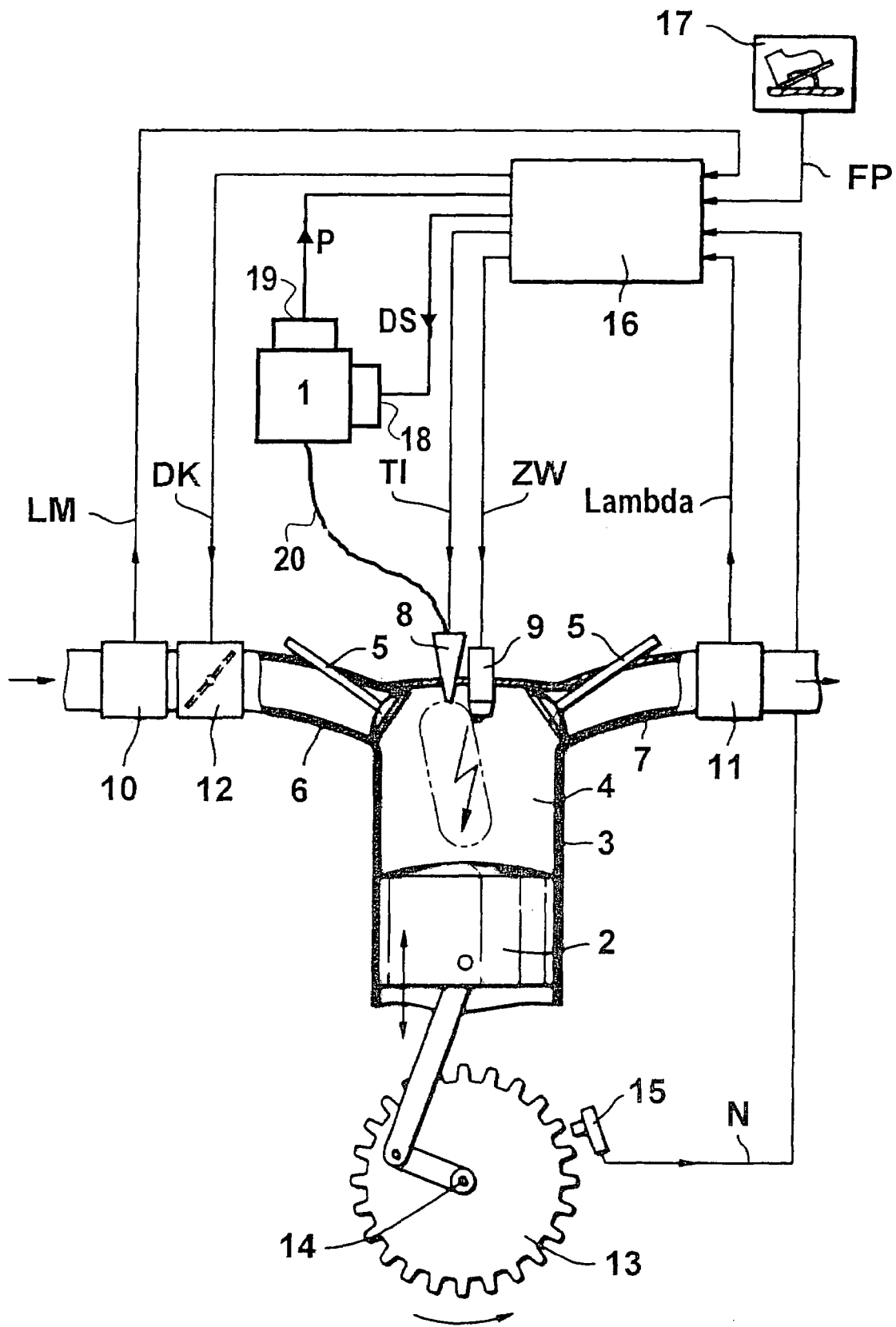
FIG. 1 shows a control unit according to the present invention and a fuel metering system for an internal combustion engine according to an embodiment of the present invention.

FIG. 1 shows a control unit 16 according to an embodiment of the present invention, which actuates an internal combustion engine. In the engine, a piston 2 is movable back and forth in a cylinder 3. Cylinder 3 has a combustion chamber 4, to which an intake pipe 6 and an exhaust pipe 7 are connected through valves 5. Also connected to combustion chamber 4 are a fuel injector 8 which is actuatable using signal TI, and a spark plug 9 which is actuatable using a signal ZW. Signals TI and ZW are transmitted here by control unit 16 to fuel injector 8 and spark plug 9, respectively.

Intake pipe 6 is equipped with an air mass sensor 10, and exhaust pipe 7 having a lambda sensor 11. Air mass sensor 10 measures the air mass of the fresh air fed to intake pipe 6, and as a function of this air mass generates a signal LM. Lambda sensor 11 measures the oxygen content of the exhaust gas in exhaust pipe 7, and as a function of the oxygen content generates a signal Lambda. The signals from air mass sensor 10 and lambda sensor 11 are supplied to control unit 16.

Intake pipe 6 contains a throttle valve 12, whose rotational position is adjustable by means of a signal DK. In addition, exhaust pipe 7 may be connected with intake pipe 6 via an exhaust return line (AGR), not shown here. The exhaust return may be controlled for example through an exhaust return valve, also not shown here, which is actuatable by control unit 16.

The method according to the present invention may be used both for diesel and for gasoline engines. In conjunction with this exemplary embodiment, the method according to the present invention is described on the basis of a gasoline engine having direct injection. A direct-injection gasoline engine of this sort may be operated in a variety of modes. In a first operating mode, homogeneous operation of the engine, throttle valve 12 is partially opened or closed depending on the desired air mass supplied. The fuel is injected into combustion chamber 4 by fuel injector 8 during an intake phase brought about by piston 2. The simultaneously aspirated air causes the injected fuel to be agitated, so that it is distributed essentially uniformly/homogeneously in combustion chamber 4. The fuel-air mixture is then compressed during the compression phase, in order to then be ignited by spark plug 9. The expansion of the ignited fuel drives piston 2. In this first operating mode, homogeneous operation, the torque of the combustion engine is essentially proportional to the air mass supplied, so that this operating mode is also referred to as air-controlled.

In a second operating mode, stratified operation of the engine, throttle valve 12 is opened wide. The fuel is injected into the combustion chamber by fuel injector 8 during a compression phase brought about by piston 2. The fuel is then ignited with the help of spark plug 9, so that in the work phase that follows piston 2 is driven by the expansion of the ignited fuel. In this second operating mode, the torque generated by the engine is substantially a function of the mass of fuel brought into combustion chamber 4. For that reason this second operating mode, stratified operation, is also referred to as fuel-controlled operating mode. The method according to the present invention thus acquires special significance, in particular in this second operating mode.

The engine is able to switch between the various operating modes with the help of the control unit. In all operating modes, driven piston 2 sets a crankshaft 14, which ultimately drives the wheels of the motor vehicle, in rotary motion. On crankshaft 14 there is a toothed wheel which scans the teeth of a speed sensor 15 directly opposite. Speed sensor 15 generates a signal from which the speed N of crankshaft 14 is determined, and transmits this signal N to control unit 16.

In all operating modes, the mass of fuel injected into the combustion chamber by fuel injector 8 is controlled and/or regulated by control unit 16, in particular in regard to low fuel consumption and/or low emission of pollutants and/or a desired target torque. The change in pressure in the high pressure area over time is also limited in control unit 16 as a function of various factors according to the present invention. To this end, control unit 16 is provided with a microprocessor, which has stored program code in a storage medium that is suitable for performing the entire control of the fuel metering system according to the present invention.

Control unit 16 according to FIG. 1 is also connected to an accelerator pedal sensor 17, which generates a signal FP that indicates the position of an accelerator pedal/gas pedal that is operable by a driver and thus indicates the torque requested by the driver. Depending on additional operating conditions and the torque requested by the driver, the operating mode to be carried out currently is selected by control unit 16 and actuated and/or regulated accordingly.

Both in the case of a direct-injection diesel combustion engine and of a direct-injection gasoline combustion engine, the fuel is injected through fuel injector 8 into combustion chamber 4 at high pressure. In the exemplary embodiment according to FIG. 1, a common rail is labeled as 1. Common rail 1, in which the fuel is under high pressure, is connected to fuel injector 8 by a connecting line 20. A pressure regulating element 18 and a pressure sensor 19 are positioned on common rail 1. The pressure regulating element is actuated by control unit 16 through a signal DS, in order to implement a desired pressure or a desired rail pressure gradient in common rail 1. The instantaneous pressure in the common rail is measured by pressure sensor 19 and pressure signal P is transmitted to control unit 16. The illustration according to FIG. 1 does not show a pre-supply pump which transports the fuel from the tank of the motor vehicle into a low pressure area, nor a high pressure supply pump that transports the fuel from the low pressure area into the common rail.

Also not shown is a return line that connects pressure regulating element 18 with the low pressure area. Through this return line it is possible for the pressure regulating element, depending on the actuating signal DS, to release a certain mass of fuel from the common rail, where the fuel is under high pressure, back to the low pressure area. In this way, the pressure regulating element is able to influence the pressure in the common rail. The present invention is not restricted here to a specific pressure regulating element, but works in principle with any device that is capable of varying the pressure in the common rail.

The method according to the present invention which is implemented in control unit 16 is explained in greater detail in conjunction with FIGS. 2, 3 and 4 below.

Figure 2:
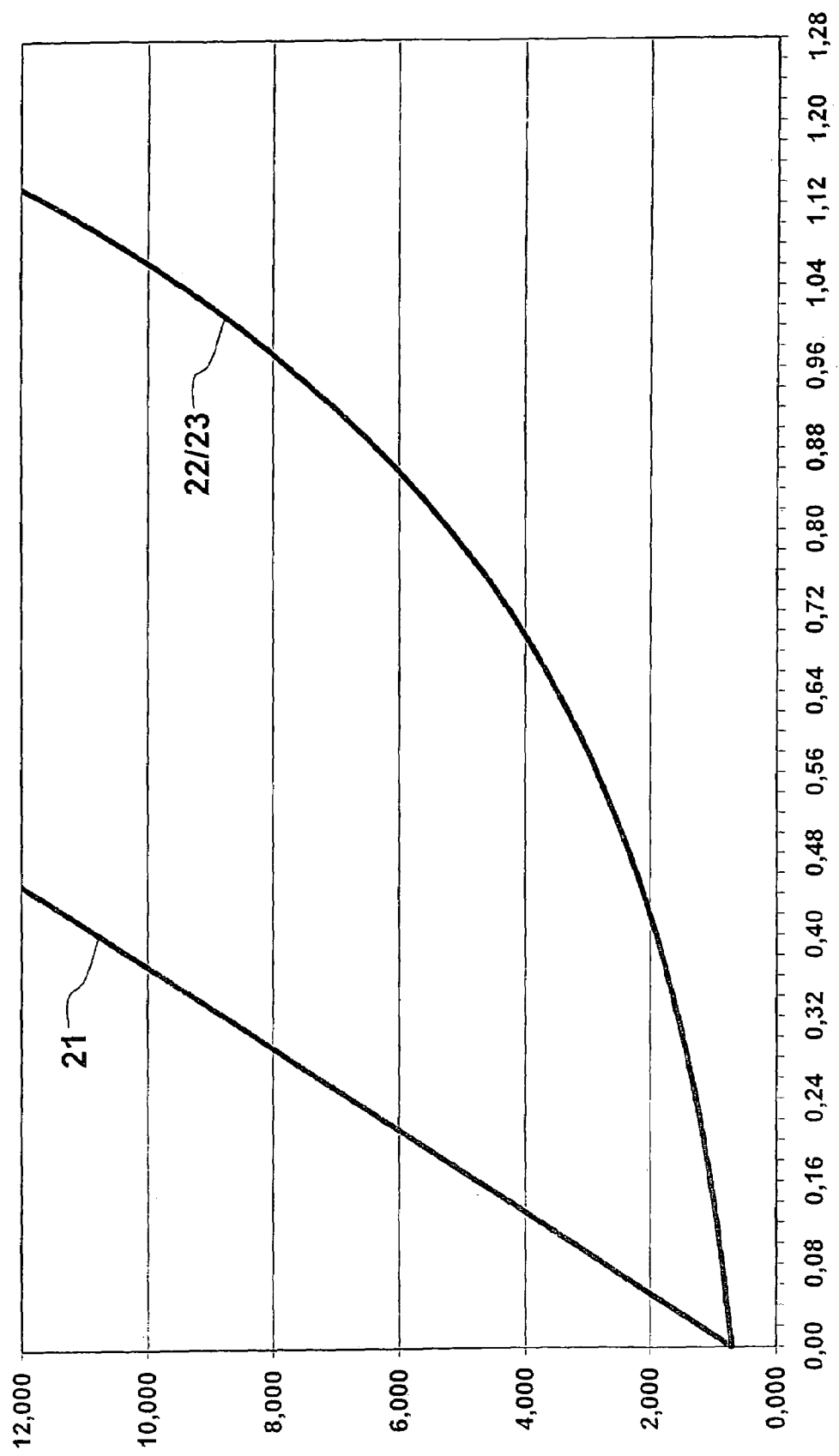
FIG. 2 shows an exemplary embodiment of the method according to the present invention.

FIG. 2 shows a first exemplary embodiment of the method according to the present invention. In the illustration according to FIG. 2, time T in seconds is shown on the horizontal axis and rail pressure P in megapascals on the vertical axis. The illustrated curves 21, 22 and 23 depict increases in rail pressure limited according to the present invention. The exemplary embodiment according to FIG. 2 applies here to an engine speed N of 1000 revolutions per minute. In practice FIG. 2 may represent a rail pressure buildup after an engine start, where the engine is operated at an idling speed of 1000 rpm when the vehicle is standing still. Both in FIG. 2 and in FIG. 3, the rail pressure at time T=0 corresponds to the admission pressure which is produced for example by an electrically operated fuel pump (EKP).

Within the framework of this invention there are a variety of possibilities for limiting rail pressure P or the rail pressure gradient to a maximum value. The following discussion illustrates three different possibilities for determining a maximum rail pressure gradient.

In the illustration according to FIG. 2 it can be seen that curves 22 and 23 are identical. The reason for this is that the determination of the maximum rail pressure gradient under the operating conditions existing in FIG. 2 (in particular an engine speed N of 1000 rpm) yields the same result with these two possibilities for determining the rail pressure gradient.

Curve 21 represents a first option for limiting the rail pressure gradient to a maximum value. In this first variant, the rail pressure gradient is limited depending on a maximum possible capacity of the high pressure pump. Because of system limitations, the high pressure pump would be essentially unable to implement a higher rise in rail pressure than is shown with curve 21. However, to support regulation of the rail pressure it makes sense to limit the rail pressure gradient by using control technology. The most significant influencing factors here are speed N of and the load on the internal combustion engine at the current operating point. Accordingly, since the performance of the supply pump, i.e., the high pressure pump is known, permissible pressure gradient values are stored in a memory of control unit 15 in speed-dependent and load-dependent characteristic maps.

Curve 22 in FIG. 2 illustrates a second option for limiting the change in pressure in the high pressure area over time.

Here, just as in the case of curve 23, the limitation is made as a function of a specifiable injection quantity error EMF. Additional starting values for calculating the limitation of the rail pressure gradient are the number of cams AN via which the high pressure pump is driven, engine speed N, instantaneous rail pressure P and computation grid TR. Computation grid TR represents the time that passes between two moments at which rail pressure gradient computations are performed. Referenced to computation grid TR, the result is thus a permissible change in rail pressure Delta_P according to the following formula:

$$Delta\_P/TR = P*(EMF*EMF-1)*TR*N*AN/120$$

Instantaneous rail pressure P which is included in the above formula is detected for example using pressure sensor 19 according to FIG. 1. Since rail pressure P is only detected at discreet points in time, the influence of sampling time TA, in particular at higher engine speeds N, is no longer negligible. Particularly at higher engine speeds N and depending on sampling frequency TA of rail pressure P, it is advisable to limit the rail pressure gradient in reference to twice the sampling frequency 2*TA. This is the method of computation used for curve 23. In detail, the result is thus the maximum permissible rail pressure change per computation grid TR according to the following formula:

$$Delta\_P/TR = P*(EMF*EMF-1)*TR/(2*TA)$$

In the range of low speeds N, such as in FIG. 2 at 1000 rpm, the two computation formulas result in the same rail pressure curve, so that curves 22 and 23 are identical. In the illustration according to FIG. 2, curve 21 corresponds for example to a constant rail pressure gradient of 0.5 megapascals per 20 milliseconds. Curve profile 22 corresponds to a maximum injection quantity error EMF of 5% per pumping cycle TZ of the high pressure pump. Curve 23 corresponds to a maximum injection quantity error EMF of 5% per double sampling frequency 2*TA of rail pressure P.

Figure 3:
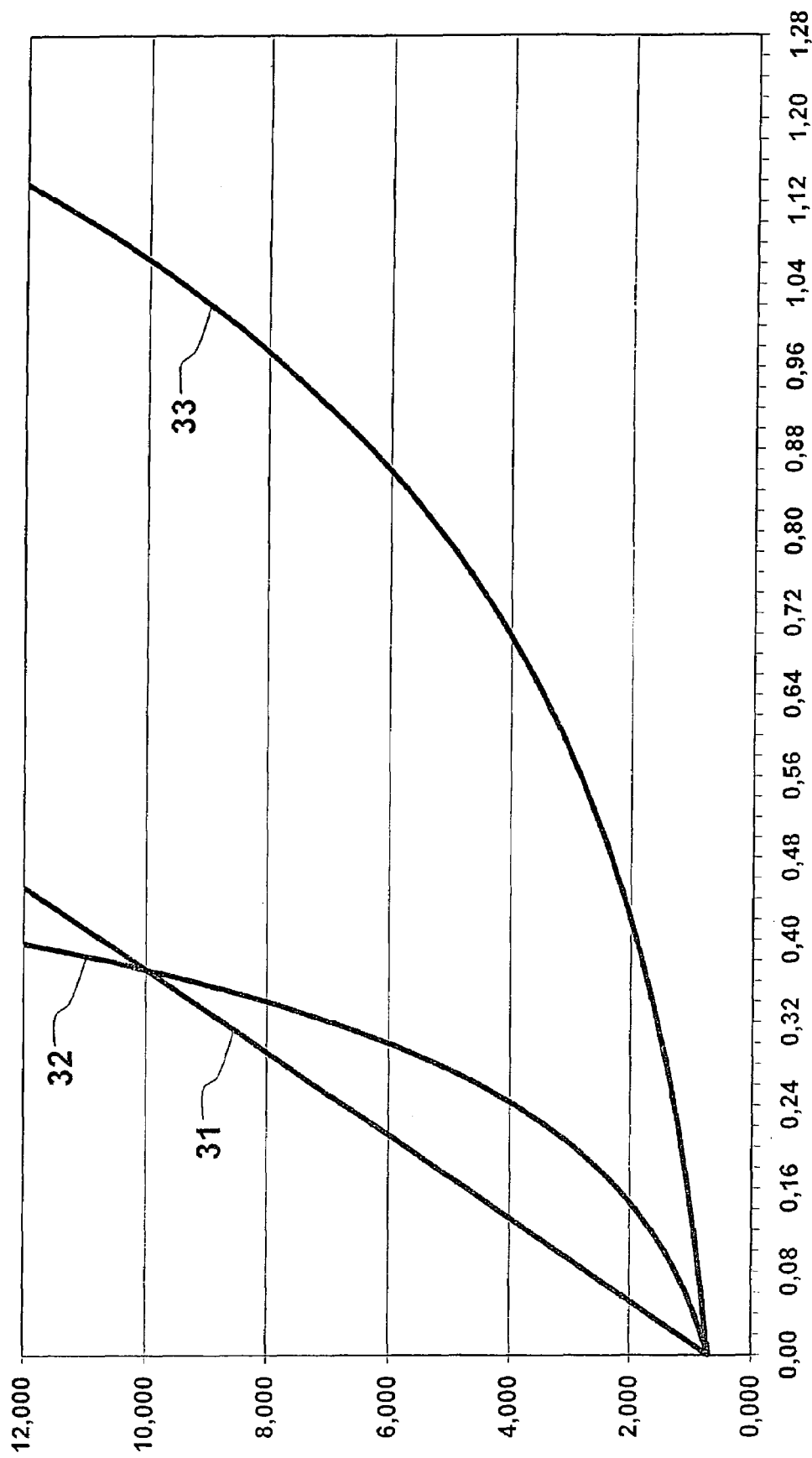
FIG. 3 shows a second exemplary embodiment of the method according to the present invention.

FIG. 3 shows a second exemplary embodiment of the method according to the present invention. In contrast to the illustration according to FIG. 2, here a pressure increase in the common rail is shown at an engine speed N of 3000 rpm. Curve 31 here, like curve 21 according to FIG. 2, corresponds to a constant rail pressure gradient of 0.5 megapascals per 20 milliseconds. Curve 32, like curve 22 according to FIG. 2, corresponds to a maximum injection quantity error EMF of 5% per pumping cycle TZ of the high pressure pump. Curve 33, like curve 23 according to FIG. 2, corresponds to a maximum injection quantity error EMF of 5% per double sampling frequency 2*TA. In contrast to the illustration according to FIG. 2, in FIG. 3 the influence of higher speed N on computation options 2 and 3 becomes clear.

It is recognizable in both FIG. 2 and FIG. 3 that the permissible rail pressure gradient increases as rail pressure P rises. This is caused by a decrease in the relative injection quantity error with increasing rail pressure P and constant rail pressure gradient. According to the present invention, at every time T the rail pressure curve that exhibits the smallest rail pressure gradient is selected for controlling by control unit 16. These are curves 22 and 23 jointly in FIG. 2 and curve 33 in FIG. 3. All in all, the buildup in rail pressure with the selection of the maximum rail pressure gradient depending on the injection quantity error, according to the present invention, is significantly slower than systems according to the known methods, in particular at low rail pressures. Compliance with a permissible injection quantity error is guaranteed, however, which is absolutely necessary in regard to conforming with present and future exhaust guidelines.

One of advantages of the method according to the present invention are at the operating points at which there is a rapid pressure buildup with high rail pressure gradients, as is the case for example in the post-startup phase or when there is a jump in the setpoint value of the rail pressure. In these cases, with the method according to the present invention, the permissible lambda limiting values are maintained, which is also verifiable by measuring the lambda value and simultaneously monitoring the rail pressure gradient during rapid pressure buildup.

As already explained above, the method according to the present invention is usable in every operating situation of the fuel supply system in which there is a jump in the setpoint value of the rail pressure.

Figure 4:
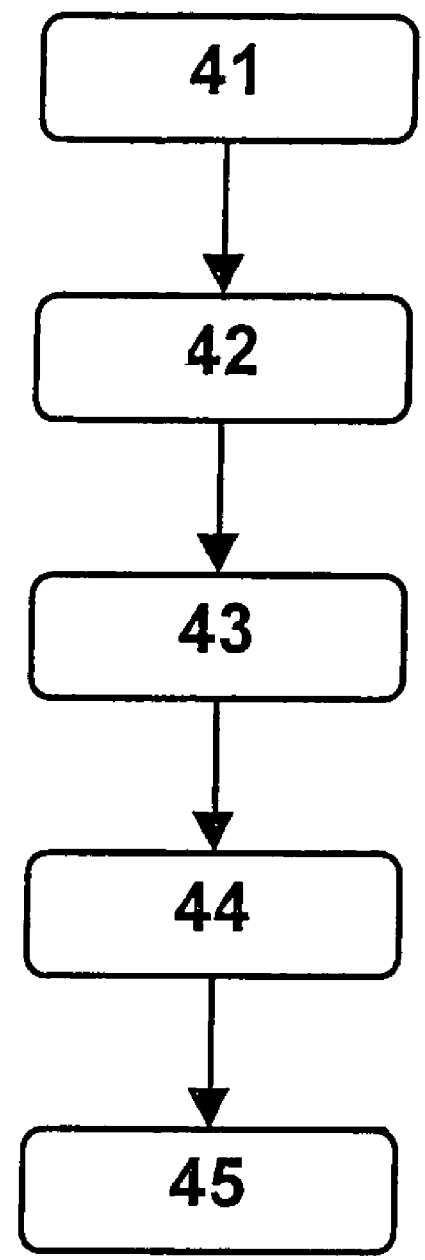
FIG. 4 shows an exemplary flow chart of the method according to the present invention.

FIG. 4 shows a flow chart of an exemplary embodiment of the method according to the present invention. In a first step 41, initial values are detected by control unit 16 or read out from the memory in the control unit. These starting values for the subsequent computation are for example the actual rail pressure value, the rail pressure sampling time TA, the permissible injection quantity error, computation grid TR, the number of cams via which the high pressure pump is driven, cycle time TZ of the pumping cycle of the supply pump, and the speed of the engine. Step 41 is followed by a step 42, in which a check is first performed of whether the speed of the engine is higher than a specifiable threshold value. Depending on whether the speed is above or below the specific threshold value, a distinction is made between the two previously stated computation formulas for limiting the rail pressure gradient depending on a specifiable injection quantity error EMF.

Step 42 is followed by Step 43, in which a calibrated maximum rail pressure gradient is read from a characteristic map in the control unit, as a function of speed N of the engine and the instantaneous load on the engine. In subsequent step 44 a minimum value is selected between the particular maximum rail pressure gradients according to step 43 and step 42. Step 44 is followed by step 45, in which pressure regulating element 18 is actuated in accordance with the maximum rail pressure gradient which was selected in step 44.

Theoretically, an additional approach includes estimating the rail pressure in advance using complex computation means, which is extremely costly however and correspondingly computation-intensive. This possibility clearly goes beyond the control units for operating a fuel metering system that corresponds to the present related art. In comparison, the possibility according to the present invention for limiting the maximum rail pressure gradient represents a simple and reliable approach, which in addition is also inexpensive, since no additional hardware components are necessary.

It is noted once more that the method according to the present invention may be used for both gasoline and diesel combustion engines. It is within the discretion of the person skilled in the art to adapt the method according to the present invention to the different rail pressures prevailing in the various systems.

What is claimed is:

1. A method for operating a fuel metering system of a motor vehicle during a starting phase of an internal combustion engine to increase a fuel pressure in at least one high pressure area to an operating pressure, a fuel being delivered by at least one supply pump to the at least one high pressure area and being injected by at least one fuel injector from the high pressure area directly into at least one combustion chamber, the method comprising:
   detecting a pressure in the high pressure area using at least one sensor;
   adjusting the pressure in the high pressure area using at least one pressure regulating element; and
   setting a limit to a rate of change in pressure in the high pressure area as a function of a specified value for an injection quantity error caused by pressure changes during a lag between a first time at which a fuel injection time is computed and a second time at which fuel injection begins.

2. The method of claim 1, wherein permissible pressure gradient values for the high pressure area are stored in speed-dependent and load-dependent characteristic maps.

3. The method of claim 1, wherein the limitation of the rate of the change in pressure in the high pressure area is specified for a time period between two rail pressure gradient computations.

4. The method of claim 1, wherein the limitation of the rate of the change in pressure in the high pressure area is determined as a function of at least one of the following:
   i) an instantaneous pressure in the high pressure area;
   ii) a sampling rate of a pressure measurement in the high pressure area;
   iii) an engine speed; and
   iv) characteristic data of the supply pump.

5. The method of claim 1, further comprising:
   determining potential limiting values of a change in pressure in the high pressure area over time using at least two different techniques;
   determining a minimum value of the potential limiting values by a comparison operation; and
   selecting the minimum value as the limit for the change in pressure in the high pressure area over time.

6. A computer-readable medium having stored thereon a computer program, the computer program including a sequence of instructions executable on a control unit of an internal combustion engine of a motor vehicle, the sequence of instructions which, when executed, cause the control unit to perform a method for controlling a fuel metering system of the internal combustion engine during a starting phase of the internal combustion engine to increase a fuel pressure in at least one high pressure area of the fuel metering system to an operating pressure, the method comprising:
   detecting a pressure in the high pressure area of the fuel metering system using at least one sensor;

adjusting the pressure in the high pressure area using at least one pressure regulating element; and setting a limit to a rate of change in pressure in the high pressure area as a function of a specified value for an injection quantity error caused by pressure changes during a lag between a first time at which a fuel injection time is computed and a second time at which fuel injection begins.

7. A control unit for operating a fuel metering system of a motor vehicle, a fuel being delivered by at least one supply pump to at least one high pressure area and being injected by at least one fuel injector from the high pressure area directly into at least one combustion chamber, the control unit comprising:

a processor for controlling, during a starting phase of an internal combustion engine, performance of a method to increase a fuel pressure in the high pressure area to an operating pressure, the controlling including:

detection of pressure in the high pressure area using at least one sensor;

adjustment of at least one pressure regulating element for adjusting the pressure in the high pressure area; and a setting of a limit to a rate of a change in pressure in the high pressure area as a function of a specified value for an injection quantity error caused by pressure changes during a lag between a first time at which a fuel injection time is computed and a second time at which fuel injection begins.

8. A fuel metering system for an internal combustion engine of a motor vehicle, comprising:

at least one high pressure area;

at least one supply pump for delivering fuel to the at least one high pressure area;

at least one fuel injector for direct injection of the fuel from the high pressure area into at least one combustion chamber of the engine;

at least one sensor for detecting a pressure in the high pressure area; and at least one pressure regulating element for adjusting the pressure in the high pressure area;

wherein, for increasing, during a starting phase of the internal combustion engine, a fuel pressure in the high pressure area to an operating pressure, a limit to a rate of change in pressure in the high pressure area is set as a function of a specified value for an injection quantity error caused by pressure changes during a lag between a first time at which a fuel injection time is computed and a second time at which fuel injection begins.

* * * * *